US010425919B2

(12) United States Patent
Verma et al.

(10) Patent No.: US 10,425,919 B2
(45) Date of Patent: Sep. 24, 2019

(54) DECOUPLED DOWNLINK AND UPLINK

(71) Applicant: AVAGO TECHNOLOGIES INTERNATIONAL SALES PTE. LIMITED, Singapore (SG)

(72) Inventors: Sindhu Verma, Bangalore (IN); Soumen Chakraborty, Sarjapura (IN)

(73) Assignee: AVAGO TECHNOLOGIES INTERNATIONAL SALES PTE. LIMITED, Singapore (SG)

( * ) Notice: Subject to any disclaimer, the term of this patent is extended or adjusted under 35 U.S.C. 154(b) by 1105 days.

(21) Appl. No.: 14/708,121

(22) Filed: May 8, 2015

(65) Prior Publication Data

US 2015/0245339 A1 Aug. 27, 2015

Related U.S. Application Data

(63) Continuation of application No. 13/336,208, filed on Dec. 23, 2011, now Pat. No. 9,060,351.

(51) Int. Cl.
| | |
|---|---|
| *H04W 72/04* | (2009.01) |
| *H04W 72/12* | (2009.01) |
| *H04W 52/14* | (2009.01) |
| *H04W 48/12* | (2009.01) |
| *H04W 72/02* | (2009.01) |
| *H04W 76/15* | (2018.01) |
| *H04W 84/04* | (2009.01) |

(52) U.S. Cl.
CPC ....... *H04W 72/0406* (2013.01); *H04W 48/12* (2013.01); *H04W 52/14* (2013.01); *H04W 72/02* (2013.01); *H04W 72/042* (2013.01); *H04W 72/044* (2013.01); *H04W 72/0473* (2013.01); *H04W 72/1273* (2013.01); *H04W 72/1289* (2013.01); *H04W 76/15* (2018.02); *H04W 84/047* (2013.01)

(58) Field of Classification Search
CPC ................................................. H04W 52/04–50
See application file for complete search history.

(56) References Cited

U.S. PATENT DOCUMENTS

| 5,487,174 A | 1/1996 | Persson |
| 5,809,430 A | 9/1998 | D'Amico |
| 6,295,450 B1 | 9/2001 | Lyer et al. |
| 6,363,252 B1 | 3/2002 | Hamalainen et al. |
| 6,532,221 B1 | 3/2003 | Kim et al. |

(Continued)

FOREIGN PATENT DOCUMENTS

| CN | 1689246 A | 10/2005 |
| CN | 101834659 A | 9/2010 |

(Continued)

*Primary Examiner* — Pao Sinkantarakorn
(74) *Attorney, Agent, or Firm* — Morgan, Lewis & Bockius LLP

(57) ABSTRACT

The present disclosure provides systems and methods for decoupling downlinks and uplinks between user equipment (UE) and base stations. Briefly described, in architecture, one embodiment of the system comprises UE (e.g., cellular telephones, mobile devices, etc.) for independently establishing an uplink (UL) and a downlink (DL). One embodiment of the method comprises the steps of establishing a DL to an optimal DL base station (BS), and establishing an UL to an optimal UL BS.

20 Claims, 8 Drawing Sheets

(56) References Cited

U.S. PATENT DOCUMENTS

| | | | |
|---|---|---|---|
| 7,162,244 B1 | 1/2007 | Toskala | |
| 7,672,282 B1 | 3/2010 | Chhabra | |
| 7,693,538 B2 | 4/2010 | Miklos et al. | |
| 7,756,520 B2 | 7/2010 | Hashem et al. | |
| 7,764,654 B2 | 7/2010 | Tran | |
| 7,899,004 B2 | 3/2011 | Ulupinar et al. | |
| 7,929,507 B2 | 4/2011 | Goodall et al. | |
| 7,983,674 B2 | 7/2011 | Julian et al. | |
| 8,284,747 B1 | 10/2012 | Chhabra | |
| 8,351,977 B2 | 1/2013 | Lee et al. | |
| 2007/0037595 A1 | 2/2007 | Shpak | |
| 2008/0062925 A1* | 3/2008 | Mate | H04W 52/244 370/331 |
| 2010/0111013 A1 | 5/2010 | Chou | |
| 2012/0063414 A1 | 3/2012 | Ramachandran | |
| 2013/0040675 A1* | 2/2013 | Ant | H04W 52/226 455/509 |

FOREIGN PATENT DOCUMENTS

| | | |
|---|---|---|
| CN | 102006153 A | 4/2011 |
| EP | 1188261 A1 | 3/2002 |

\* cited by examiner

DECOUPLED DOWNLINK AND UPLINK

CROSS-REFERENCE TO RELATED APPLICATIONS

This application is a continuation of U.S. patent application Ser. No. 13/336,208, entitled "Decoupled Downlink and Uplink," filed on Dec. 23, 2011, which is expressly incorporated by reference herein.

BACKGROUND

Field of the Disclosure

This disclosure relates generally to telecommunications, and more particularly to handoff and cellular site selection.

Description of Related Art

In a telecommunications network (e.g., cellular networks, etc.), user equipment (e.g., cellular telephone, mobile device, etc.) establishes a communication link with a base station (e.g., cell site). This communication link allows transmission of data to the base station (uplink) and, also, reception of data from the base station (downlink).

Standard-setting bodies within various telecommunications industries have promulgated standards for how user equipment (UE) is required to uplink (UL) and downlink (DL) to base stations. These standards require the user equipment to UL and DL with the same base station (BS). Thus, when the UE migrates out of range from one BS and into range of another BS, the standards require simultaneous handoff (or handover) of both the UL and DL from one BS to another. This simultaneous handoff (HO) of both the UL and DL has its limitations.

SUMMARY

The present disclosure provides systems and methods for decoupling downlinks and uplinks between user equipment (UE) and base stations. Briefly described, in architecture, one embodiment of the system comprises UE for independently establishing an uplink (UL) and a downlink (DL). One embodiment of the method comprises the steps of establishing a DL to an optimal DL base station (BS), and establishing an UL to an optimal UL BS.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION OF THE EMBODIMENTS

Figure 1:
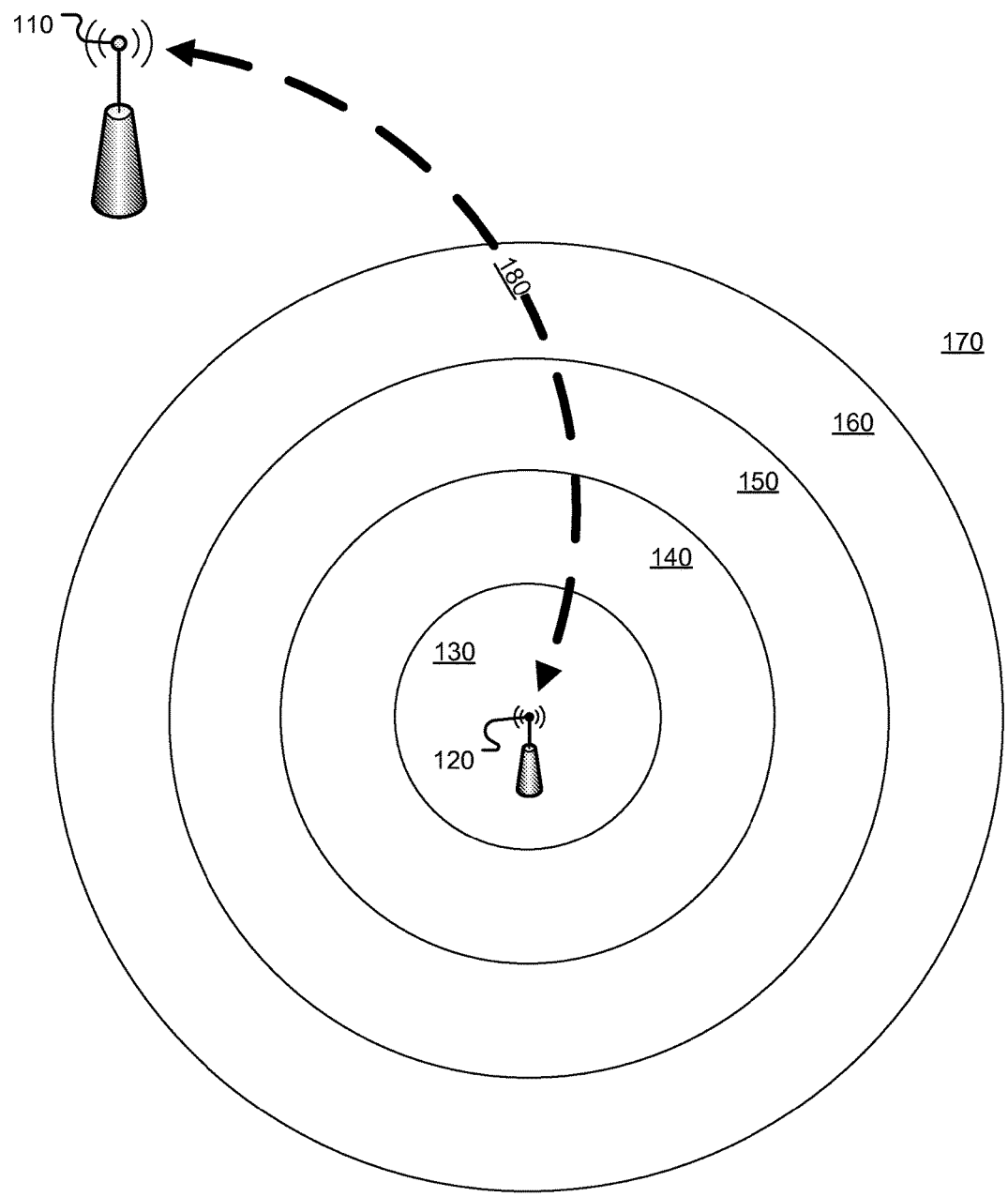
FIG. 1 is a diagram showing different zones having different signal strengths.

Industry standards prohibit user equipment (such as cellular telephones and other mobile devices) from simultaneously establishing an uplink to one base station (such as a cell site) and a downlink to another base station as a part of cellular site selection or handoff. Thus, when a cellular telephone switches from one cell site to another cell site, the standards require simultaneous handoff for both the uplink and the downlink. Thus, even though one cell site may be more optimal for downlink and a different cell site may be more optimal for uplink, the cellular telephone cannot downlink with one cell site and uplink with another cell site.

The systems and methods described herein overcome such a limitation by decoupling downlinks and uplinks so that the user equipment may downlink with one base station while uplinking with another base station. Given this, one embodiment of the user equipment comprises a processor that determines an optimal downlink base station. The processor also determines an optimal uplink base station. The optimal uplink base station is determined independently of the optimal downlink base station, thereby allowing the user equipment to downlink with the optimal downlink base station and uplink with the optimal uplink base station. Once the downlink and uplink are established, a receiver on the user equipment receives data from the optimal downlink base station while a transmitter on the user equipment transmits data to the optimal uplink base station. In the event that the optimal downlink base station is the same as the optimal uplink base station, the user equipment uplinks and downlinks to the same base station.

Another aspect of this disclosure is a method for decoupling uplink and downlink determinations. In one embodiment of the method, the user equipment listens for available base stations and monitors the signal strengths of each of the base stations. Based on the monitored signal strengths, the user equipment independently determines the optimal downlink base station and the optimal uplink base station. For some embodiments, the optimal uplink base station is determined as a function of downlink signal strength and path loss.

With this overview in mind, reference is now made in detail to the description of the embodiments as illustrated in the drawings. While several embodiments are described in connection with these drawings, there is no intent to limit the disclosure to the embodiment or embodiments disclosed herein. On the contrary, the intent is to cover all alternatives, modifications, and equivalents.

FIG. 1 is a diagram showing different zones 130, 140, 150, 160, 170 of differing signal strengths. For illustrative purposes, FIG. 1 shows only two base stations 110, 120, with one base station (BS) being a macro-BS 110 and the other base station being a femto-BS 120. The femto-BS 120 is communicatively coupled to the macro-BS 110 by a backhaul 180, which permits data exchange between the femto-BS 120 and the macro-BS 110.

As shown in FIG. 1, as radial distances from the femto-BS 120 increase, the signal strength from the femto-BS 120 correspondingly diminishes as a function of the radial distance. In other words, the femto-BS 120 will have a greater effect on a zone 130 (referred to herein as "Zone-A" 130) that is closer to the femto-BS 120 than it will on any other zone 140, 150, 160, 170 (referred to in increasing distance from the femto-BS 120 as "Zone-B" 140, "Zone-C" 150, "Zone-D" 160, and "Zone-E" 170) that is farther away from the femto-BS.

Figure 2:
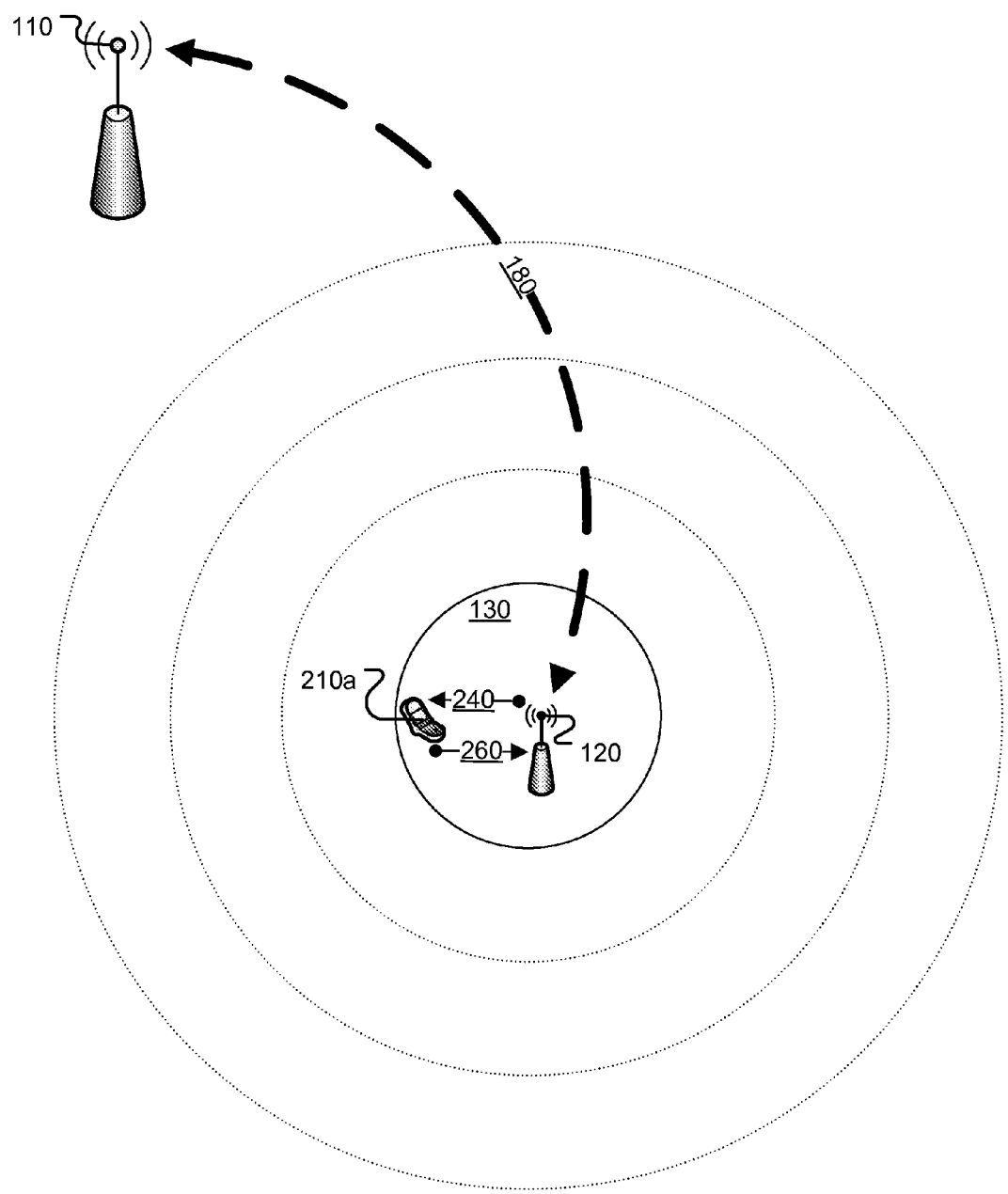
FIG. 2 is a diagram showing a mobile device in one zone from FIG. 1.

FIG. 2 is a diagram showing a mobile device 210a that is operating in Zone-A 130, which is the closest zone to the femto-BS 120. As shown in FIG. 2, the device 210a listens for available base stations 110, 120 and monitors signal strengths from each of the available base stations (e.g., femto-BS 120 and macro-BS 110). From the monitored signal strengths, the device 210a determines whether the femto-BS 120 provides an optimal downlink (DL) to the device 210a, or whether the macro-BS 110 provides an optimal DL to the device 210a. One way of determining the optimal DL BS is by simply selecting the BS as a function of DL signal strength. Insofar as the device 210a is in Zone-A 130, the femto-BS 120 (rather than the macro-BS 110) has greater DL signal strength and, therefore, is determined to be the optimal DL BS. As such, a downlink (DL) 240 is established between the device 210a and the femto-BS 120. This DL 240 allows a receiver in the device 210a to DL with the femto-BS 120 and receive data from the femto-BS 120.

Independent of the DL determination, the device 210a determines whether the femto-BS 120 provides an optimal uplink (UL) to the device 210a, or whether the macro-BS 110 provides an optimal UL to the device 210a. Again, since the device 210a is in Zone-A 130, the femto-BS 120 (rather than the macro-BS 110) is determined to be the optimal UL BS. Consequently, uplink (UL) 260 is established between the device 210a and the femto-BS 120. The UL 260 allows a transmitter in the device 210a to uplink to the femto-BS 120 and transmit data to the femto-BS 120.

In determining the optimal UL BS, the device 210a determines path losses from each of the available BS 110, 120. One way of determining path loss is by subtracting a measured signal strength at the device 210a from the transmit power of each BS. The path loss for each BS is then used as a proxy for UL signal strength, and the UL signal strength is then used as a basis for determining which BS is optimal for UL from the device 210a. In other words, a processor within the device 210a determines the DL signal strength and also the received signal strength, and then calculates the path loss as a function of the DL signal strength and the received signal strength. An optimal UL BS is then determined as a function of the path loss.

Figure 3:
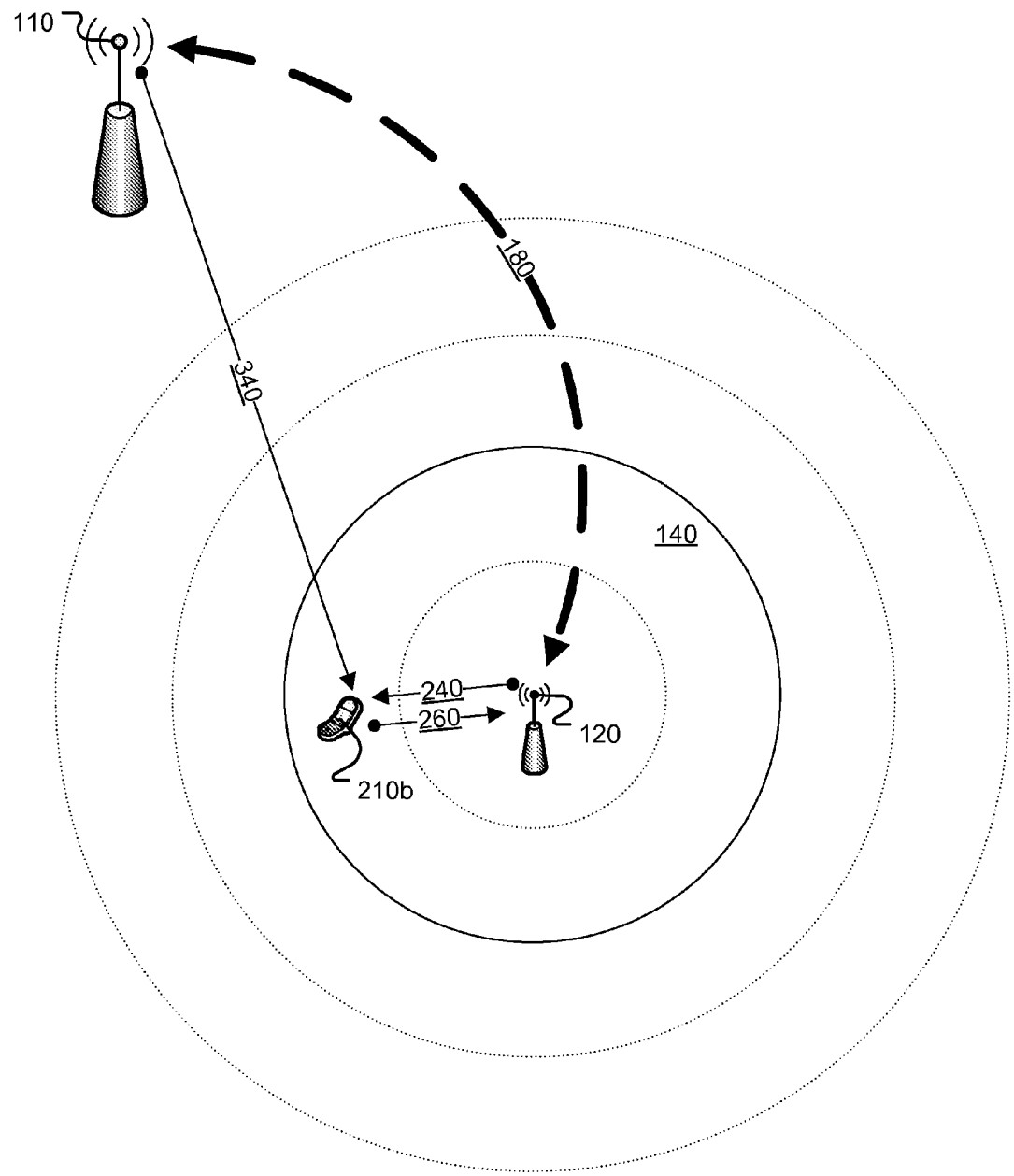
FIG. 3 is a diagram showing the device in another zone from FIG. 1.

FIG. 3 is a diagram showing a mobile device 210b that is operating in Zone-B 140, which is more radially-distant from the femto-BS 120 than Zone-A 130. Similar to the process described with reference to FIG. 2, the device 210b listens for available base stations 110, 120 and monitors signal strengths from each available BS in order to determine whether the femto-BS 120 or the macro-BS 110 is the optimal BS for uplinking and downlinking. Unlike FIG. 2, the device 210b, which is now in Zone-B 140, now determines that both the femto-BS 120 and the macro-BS 110 are acceptable for downlinking. As such, DL 240 is established between the device 210b and the femto-BS 120, and DL 340 is also established between the device 210b and the macro-BS 110. By establishing two DL 240, 340, enhancement of DL data throughput is achieved.

The device 210b, again, independently determines whether the femto-BS 120 provides an optimal uplink (UL) to the device 210b, or whether the macro-BS 110 provides an optimal UL to the device 210b. In FIG. 3, due to the distance between the device 210b and the macro-BS 110, the device 210b in Zone-B 140 favors uplinking with the femto-BS 120 (rather than the macro-BS 110). Consequently, UL 260 is established between the device 210b and the femto-BS 120.

As one can appreciate, since the DL-decision and UL-decision are now decoupled, the mobile device 210b (or any other user equipment) can selectively UL and DL with different BS, thereby enhancing data throughput.

Figure 4:
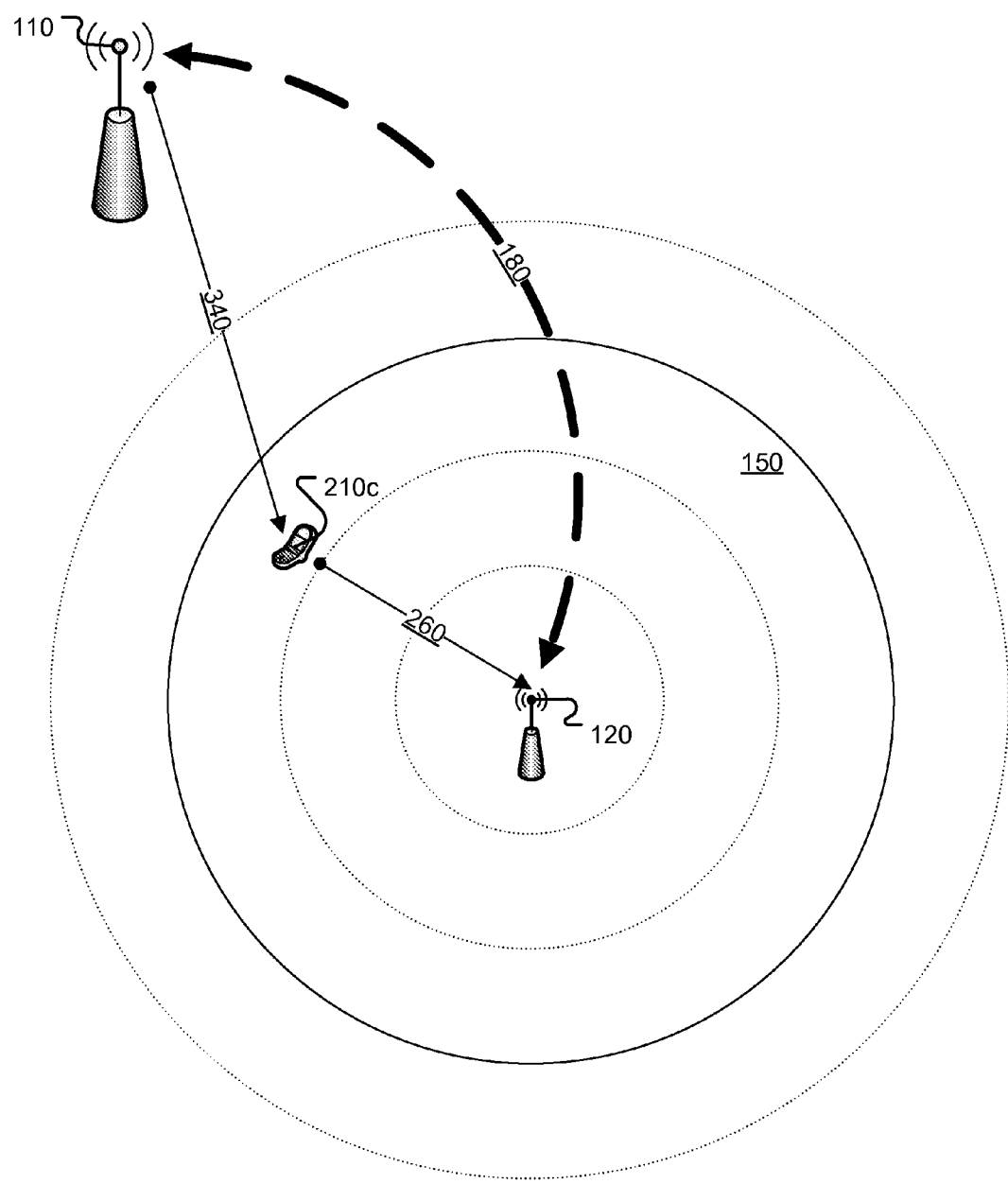
FIG. 4 is a diagram showing the device in yet another zone from FIG. 1.

FIG. 4 is a diagram showing a mobile device 210c that is operating in Zone-C 150, which is more radially-distant from the femto-BS 120 than either Zone-A 130 or Zone-B 140. This can happen when the mobile device of FIG. 3 migrates from Zone-B 130 into Zone-C 150. Similar to the processes described with reference to FIGS. 2 and 3, the mobile device 210c again listens for available base stations 110, 120 and monitors signal strengths from each available BS in order to independently determine which BS is the optimal UL BS and which BS is the optimal DL BS.

Unlike FIG. 2, the device 210c, which is now operating in Zone-C 150, determines that the macro-BS 110 is the optimal DL BS. As such, DL 340 is established between the device 210c and the macro-BS 110. Specifically, if the device 210c has migrated into Zone-C 150 from Zone-B 140, then the device 210c maintains its DL 340 with the macro-BS 110, but severs the DL 240 with the femto-BS 120.

Independent of its DL determination, the device 210c determines which of the available BS is the optimal UL BS. Similar to FIG. 3, the device 210c in Zone-C 150 determines that the femto-BS 120 (rather than the macro-BS 110) is the optimal UL BS. Consequently, UL 260 is maintained between the device 210c and the femto-BS 120. By decoupling the UL and DL, the mobile device 210c (or any other user equipment) can now UL with an optimal UL BS (such as the femto-BS 120 in this example), which may be different from an optimal DL BS (such as the macro-BS 110 in this example). Additionally, since the UL and DL determinations are independent of each other, one BS need not simultaneously handoff (HO) both the UL and the DL as the device 210c migrates from one zone (e.g., Zone-B 140) to another (e.g., Zone-C 150).

Unlike FIGS. 2 and 3, there is no DL from the femto-BS 120 to the device 210c for the embodiment of FIG. 4. Additionally, there is no UL from the device 210c to the macro-BS 110. According to current industry standards, scheduling occurs in the DL. In other words, for every UL, the standards require a DL for ACK/NACK. Thus, in order for the scheduling to properly occur, UL 260 data between the device 210c and the femto-BS 120 is conveyed from the femto-BS 120 to the macro-BS 110 through the backhaul 180. The macro-BS 110 is now able to close the loop to the device 210c and provide ACK/NACK to the device 210c through the DL 340.

Figure 5:
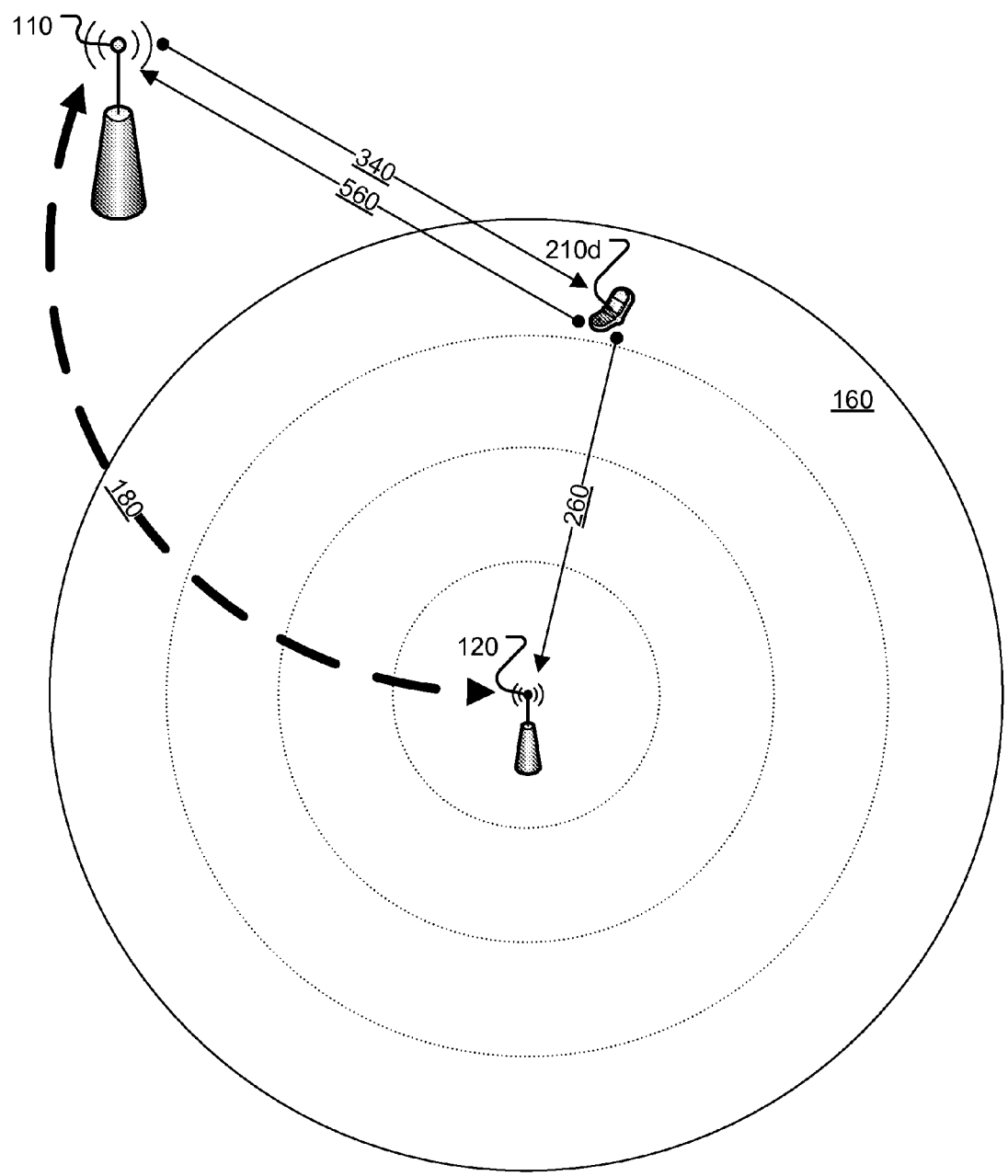
FIG. 5 is a diagram showing the device in yet another zone from FIG. 1.

FIG. 5 is a diagram showing a mobile device 210d that is operating in Zone-D 160, which is more radially-distant from the femto-BS 120 than Zone-C 150. Once again, the device 210d listens for available base stations 110, 120 and monitors signal strengths from each available BS in order to determine which BS is the optimal DL BS and which BS is the optimal UL BS. In FIG. 5, the device 210d, which is now in Zone-D 160, determines whether the femto-BS 120 provides an optimal DL to the device 210d, or whether the macro-BS 110 provides an optimal DL to the device 210d. In FIG. 5, due to the distance between the device 210d and the femto-BS 120, the device 210d in Zone-D 160 favors downlinking with the macro-BS 110 (rather than the femto-BS 120). Consequently, DL 340 is established between the device 210d and the macro-BS 110.

As for the UL determination, the device 210d in Zone-D 160 determines that UL to both BS 110, 120 are acceptable. Thus, both UL 260 (between the device 210d and the femto-BS 120) and UL 560 (between the device 210d and the macro-BS 110) are established. By establishing two UL 260, 560, the UL throughput is now increased.

Similar to FIG. 4, there is no DL from the femto-BS 120 to the device 210d for the embodiment of FIG. 5. Since every UL requires a DL for ACK/NACK for proper scheduling, UL 260 data between the device 210c and the femto-BS 120 is conveyed from the femto-BS 120 to the macro-BS 110 through the backhaul 180. Similar to FIG. 4, the macro-BS 110 of FIG. 5 is now able to close the loop to the device 210c through the backhaul 180. Since ACK/NACK for both UL 260 and UL 560 are provided through a single DL 340, the macro-BS 110 can multiplex the ACK/NACK and transmit the multiplexed data through the single DL 340, back to the device 210d.

Figure 6:
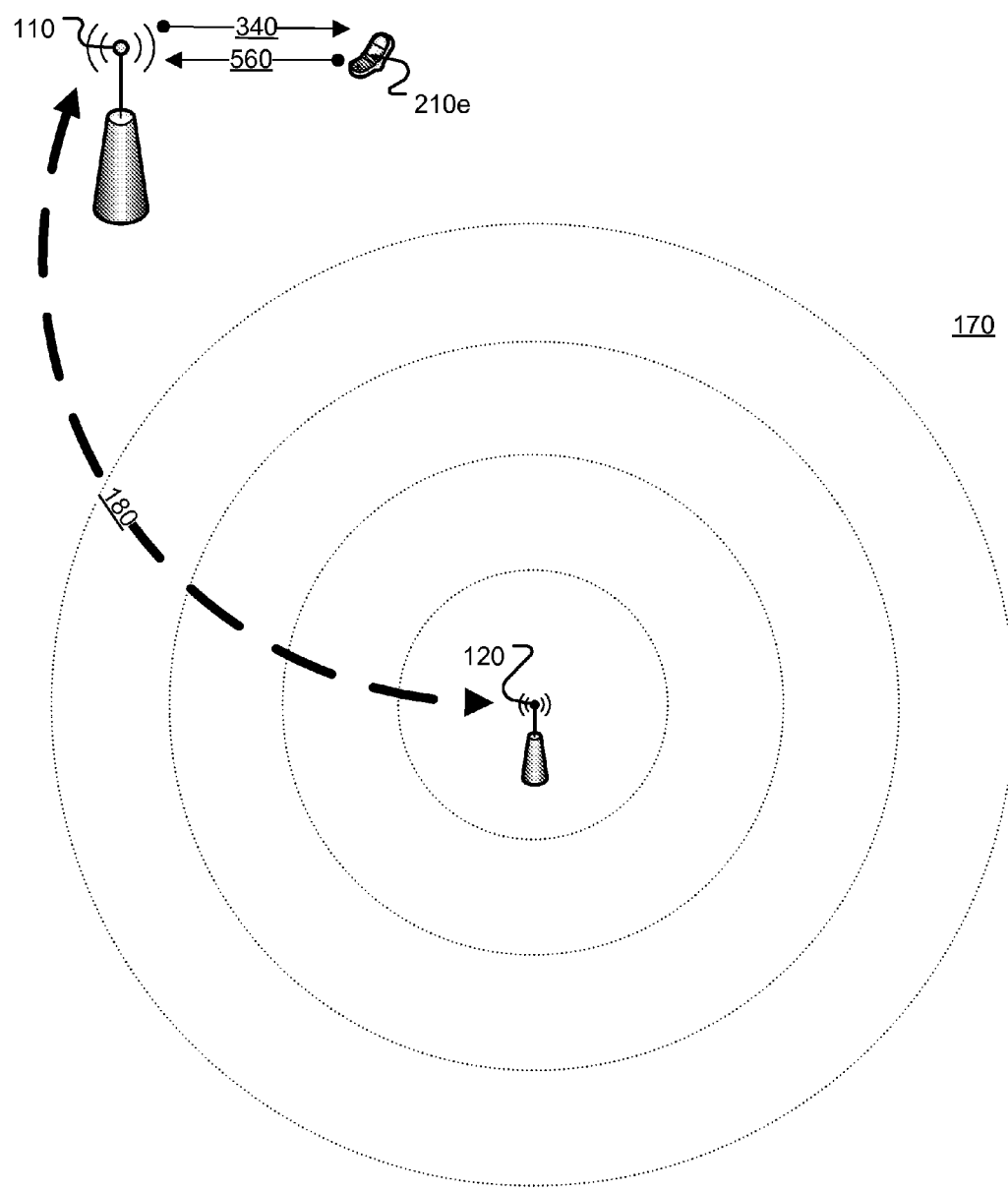
FIG. 6 is a diagram showing the device in yet another zone from FIG. 1.

FIG. 6 is a diagram showing a mobile device 210e that is operating in Zone-E 170, which is the farthest zone from the femto-BS 120. As shown in FIG. 6, the device 210e listens for available base stations 110, 120 and monitors signal strengths from each of the available base stations (e.g., femto-BS 120 and macro-BS 110). From the monitored signal strengths, the device 210e determines whether the femto-BS 120 provides an optimal DL to the device 210e, or whether the macro-BS 110 provides an optimal DL to the device 210e. Insofar as the device 210e is in Zone-E 170, the macro-BS 110 (rather than the femto-BS 120) is determined to be the optimal DL BS. This is because the femto-BS 120 is sufficiently distant from the device 210e. As such, DL 340 is established between the device 210e and the macro-BS 110.

Independent of the DL determination, the device 210e determines whether the femto-BS 120 provides an optimal UL to the device 210e, or whether the macro-BS 110 provides an optimal UL to the device 210e. Again, since the device 210e is in Zone-E 170, the macro-BS 110 (rather than the femto-BS 120) is determined to be the optimal UL BS. Consequently, UL 260 is established between the device 210e and the macro-BS 110.

Figure 7:
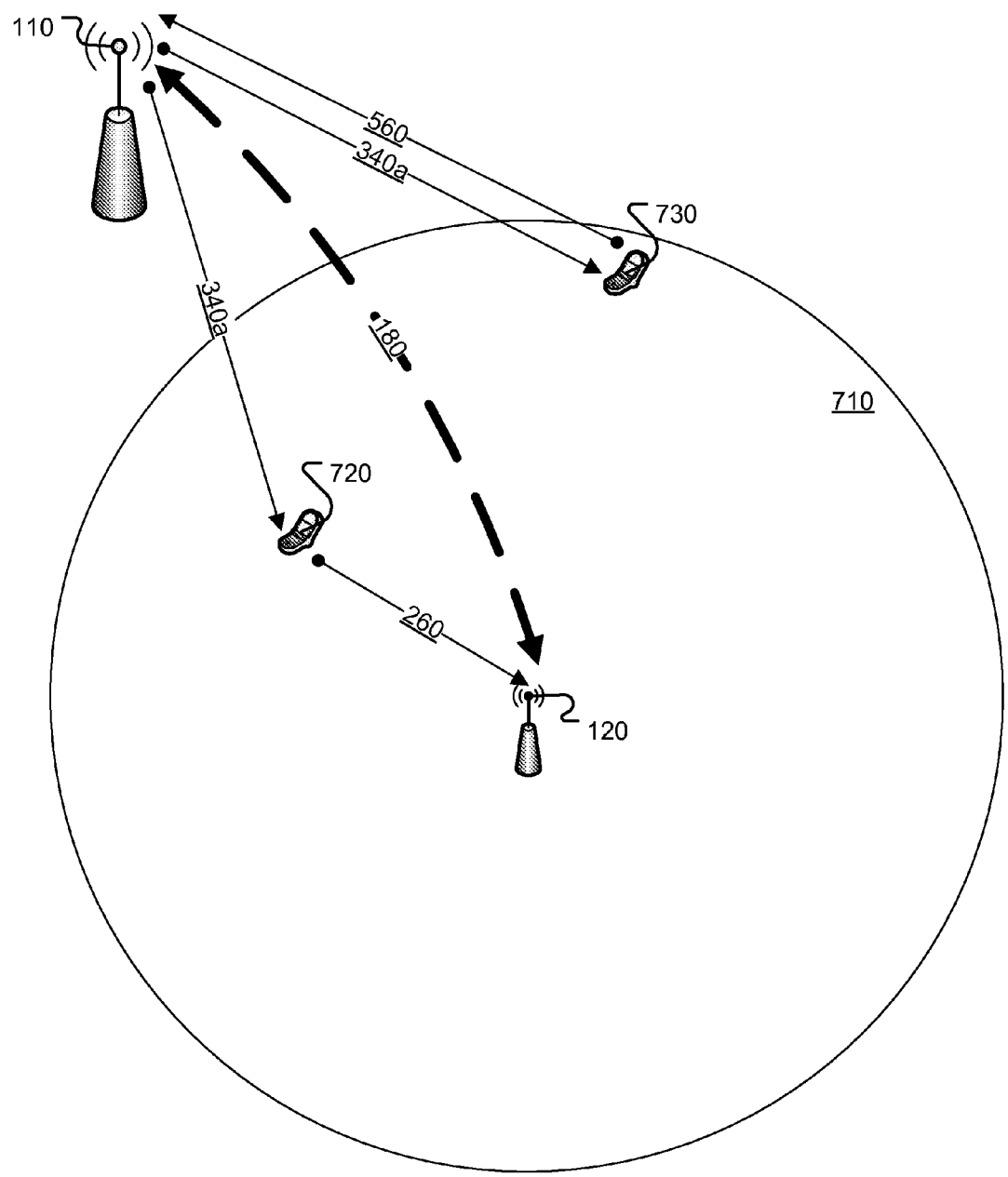
FIG. 7 is a diagram showing two mobile devices in the same zone, where both devices uplink in the same time-frequency slots but to different base stations.

FIG. 7 is a diagram showing two mobile devices 720, 730 in the same zone 710, where both devices uplink in the same time-frequency slots but to different base stations. For illustrative purposes, the two BS 110, 120 are designated as a macro-BS 110 and a femto-BS 120, and the two mobile devices 720, 730 are designated as a cellular telephone 720 and a smart phone 730. In the embodiment of FIG. 7, the cellular telephone 720 is located closer to the femto-BS 120 and farther from the macro-BS 110 than the smart phone 730. Conversely, the smart phone 730 is located closer to the macro-BS 110 and farther from the femto-BS 120 than the cellular telephone 720. However, in the embodiment of FIG. 7, the cellular telephone 720 and the smart phone 720 are allocated the same time-frequency transmission slots for their respective uplinks. This allocation of the same time-frequency transmission slots for both devices 720, 730 prohibits the two devices 720, 730 from uplinking to the same base station.

Separate uplinking of both devices 720, 730 can be accomplished by selectively setting transmission power levels for both the cellular telephone 720 and the smart phone 730, based on the distances between the devices 720, 730 and the BS 110, 120. The distances can be measured using global positioning system (GPS) coordinates of the devices 720, 730, or by some other user-equipment-position-tracking scheme based on the DL measurements reported by the devices 720, 730. For purposes of illustration, the following example uses DL measurements reported by the devices 720, 730.

In the embodiment of FIG. 7, since the smart phone 730 is closer to the macro-BS 110 than the cellular telephone 720, the smart phone 730 will report a stronger DL measurement to the macro-BS 110, while the cellular telephone 720 will report a weaker DL measurement to the macro-BS 110.

From the DL measurement reported by the cellular telephone 720, the transmit power level of the cellular telephone 720 can be set so that it is sufficiently weak that it will not be received at the macro-BS 110. This allows the cellular telephone 720 to establish DL 340a with the macro-BS 110 and an UL 260 with the femto-BS 120. The ACK/NACK is conveyed back to the cellular telephone 720 in a process similar to that described with reference to FIG. 4.

Similarly, the DL measurement reported by the smart phone 730 is used to set the transmit power level of the smart phone 730 such that the transmit power is insufficient to UL with the femto-BS 120, which is farther from the smart phone 720 and closer to the cellular telephone 720. The selective adjustment of transmit power levels for the cellular telephone 720 and the smart phone 730 allows both devices 720, 730 to UL with their respective BS 120, 110 using the same time-frequency transmission slots.

Figure 8:
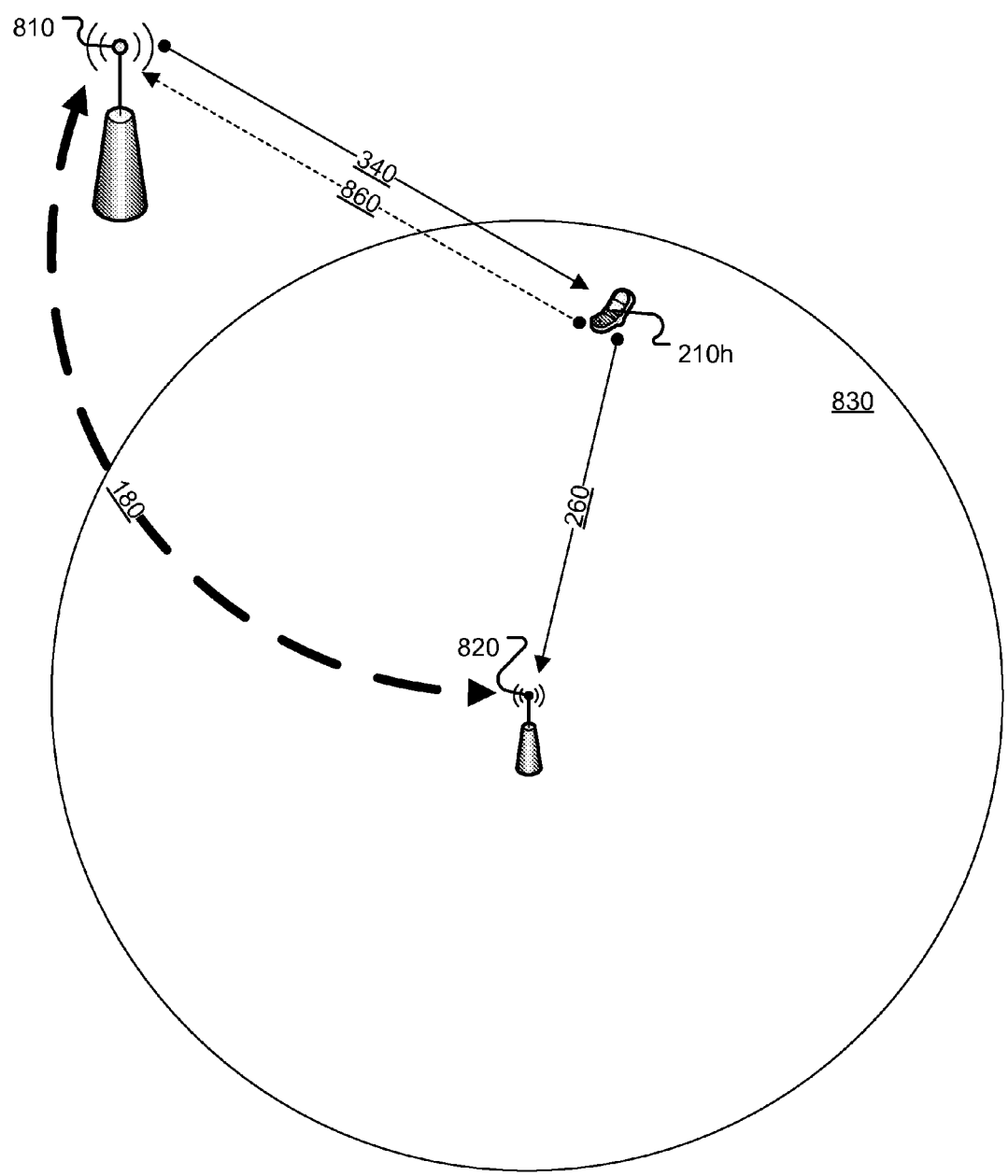
FIG. 8 is a diagram showing a mobile device uplinking with two separate base stations, but using different time-frequency slots for the two uplinks.

FIG. 8 is a diagram showing a mobile device 210h uplinking with two separate base stations 810, 820, but using different time-frequency slots for the two uplinks. Unlike the femto-BS 120 of FIGS. 1 through 7, the femto-BS 820 of FIG. 8 is a receive-only BS 820. In one embodiment, the receive-only BS 820 comprises multiple femto-BS, which serve as remote radio heads.

In the embodiment of FIG. 8, the macro-BS 810 operates over a first carrier frequency bandwidth (Carrier-1), while the receive-only BS 820 operates over a second carrier frequency bandwidth (Carrier-2). As such, the embodiment of FIG. 8 uses carrier aggregation.

In operation, the UL is decoupled from the DL. Thus, DL 340 is established between the macro-BS 810 and the mobile device 210h over Carrier-1. Independently, UL 860 is established between the macro-BS 810 and the device 210h over Carrier-1, while UL 260 is established between the receive-only BS 820 and the device 210h over Carrier-2. This configuration allows the device 210h to use Carrier-2 for UL data transmission only. Thus, heavy UL data can be transmitted over Carrier-2 from the device 210h to the receive-only BS 820 at a high modulation and coding scheme (MCS). Concurrently, the embodiment of FIG. 8 allows heavy DL data transmission from the macro-BS 810 to the device 210h over Carrier-1, while allowing for UL control data (e.g., DL ACK/NACK for UL data) transmission from the device 210h to the macro-BS 810 over Carrier-1.

As one having skill in the art can appreciate, the decoupling of UL and DL provides a variety of advantages. Additionally, the non-obvious nature of the disclosed embodiments is evidenced by the fact that all of the current industry standards relating to handoffs of user equipment prohibit decoupling of UL and DL, thereby requiring UL and DL handoffs to occur simultaneously. Additionally, insofar as the decoupling UL and DL are prohibited by the industry standards for handoffs, application of the industry standards for user-equipment handoffs would render the disclosed systems and methods inoperable. Furthermore, the disclosed embodiments change the basic principle under which the industry standards for handoffs are designed to operate.

The various functions of the processor may be implemented in hardware, software, firmware, or a combination thereof. In the preferred embodiment(s), the functions of the processor are implemented in software or firmware that is stored in a memory and that is executed by a suitable instruction execution system. If implemented in hardware, as in an alternative embodiment, the functions of the processor can be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Any process descriptions or blocks in flow charts should be understood as representing modules, segments, or portions of code which include one or more executable instructions for implementing specific logical functions or steps in the process, and alternate implementations are included within the scope of the preferred embodiment of the present disclosure in which functions may be executed out of order from that shown or discussed, including substantially concurrently or in reverse order, depending on the functionality involved, as would be understood by those reasonably skilled in the art of the present disclosure.

The processor functions, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM or Flash memory) (electronic), an optical fiber (optical), and a portable compact disc read-only memory (CDROM) (optical). Note that the computer-readable medium could even be paper or another suitable medium upon which the program is printed, as the program can be electronically captured via, for instance, optical scanning of the paper or other medium, then compiled, interpreted or otherwise processed in a suitable manner if necessary, and then stored in a computer memory.

Although exemplary embodiments have been shown and described, it will be clear to those of ordinary skill in the art that a number of changes, modifications, or alterations to the disclosure as described may be made. For example, while macro-BS and femto-BS have been used to illustrate various embodiments of the invention, it should be appreciated by one having ordinary skill in the art that the systems and methods can be extended to micro-BS, pico-BS, or other types of cell sites in heterogeneous networks. Additionally, while a mobile device has been used to illustrate various embodiments, it should be appreciated that the user equipment may be cellular telephones, smart phones, tablet computers, e-readers, or any other type of equipment that has the capability of downlinking and uplinking with a cell site. Additionally, while examples of cellular networks have been used to illustrate various embodiments, it should be appreciated that similar methods and systems can be used for UL and DL for two different radio access technologies (RAT). All such changes, modifications, and alterations should therefore be seen as within the scope of the disclosure.

What is claimed is:

1. A network device comprising:
   at least one processor circuit configured to:
   allocate a time-frequency slot to a first device for a first uplink;
   allocate the time-frequency slot to a second device for a second uplink;
   determine a first transmission power level based at least in part on a first location of the first device and a second location of the network device, the first transmission power level being strong enough for the first uplink to reach the network device;
   determine a second transmission power level based at least in part on a third location of the second device, a fourth location of another network device, and the second location of the network device, the second transmission power level being strong enough for the second uplink to reach the another network device but not the network device;
   transmit on a first downlink to the first device the first transmission power level and on a second downlink to the second device the second transmission power level; and
   establish the first uplink with the first device.

2. The network device of claim 1, wherein the at least one processor circuit is further configured to:
   receive a first downlink measurement reported by the first device and a second downlink measurement reported by the second device; and
   determine the first transmission power level based at least in part on the first downlink measurement and the second transmission power level based at least in part on the second downlink measurement.

3. The network device of claim 2, wherein the at least one processor circuit is further configured to:
   establish a first control-message uplink with the first device and a second control-message uplink with the second device; and
   receive the first downlink measurement via the first control-message uplink and the second downlink measurement via the second control-message uplink.

4. The network device of claim 1, wherein the at least one processor circuit is further configured to:
   estimate the first location of the first device, the third location of the second device, and the fourth location of the another network device.

5. The network device of claim 1, the at least one processor circuit further configured to:
transmit, via a backhaul link to the another network device, information for establishing the second uplink with the second device.

6. The network device of claim 1, wherein the network device comprises a macro-base station and the another network device comprises at least one of a femto-base station, a micro-base station, or a pico-base station.

7. The network device of claim 1, wherein the at least one processor circuit is further configured to:
receive uplink transmissions from the first device on the first uplink; and
transmit first downlink transmissions to the first device on the first downlink and second downlink transmissions to the second device on the second downlink.

8. The network device of claim 1, wherein a first distance between the first device and the network device is greater than a second distance between the second device and the network device.

9. The network device of claim 1, wherein the first transmission power is not strong enough for the first uplink to reach the another network device.

10. A method comprising:
configuring a first base station as a downlink base station for a first device and a second device;
setting, by the first base station, a first transmission power for first uplink signals of the first device based at least in part on a first location of the first device and a second location of the first base station, wherein the first uplink signals reach the first base station;
setting, by the first base station, a second transmission power for second uplink signals of the second device based at least in part on a third location of the second device, a fourth location of a second base station, and the second location of the first base station, wherein the second uplink signals reach the second base station but not the first base station; and
allocating, by the first base station, a same uplink time-frequency slot to both the first and second devices.

11. The method of claim 10, wherein the first base station receives the first uplink signals of the first device during the uplink time-frequency slot and the second base station receives the second uplink signals of the second device during the uplink time-frequency slot.

12. The method of claim 10, wherein the first base station does not receive the second uplink signals from the second device and the second base station does not receive the first uplink signals from the first device.

13. The method of claim 10, wherein a first distance between the first device and the first base station is greater than a second distance between the second device and the first base station.

14. The method of claim 10, further comprising:
establishing a first uplink of the first device with the first base station and a second uplink of the second device with the second base station.

15. The method of claim 14, further comprising:
transmitting, via a backhaul link, information from the first base station to the second base station for establishing the second uplink with the second device.

16. A non-transitory machine readable medium comprising instructions that, when executed by at least one processor, cause the at least one processor to:
allocate, by a network device, a time-frequency slot to a first device for a first uplink;
allocate the time-frequency slot to a second device for a second uplink;
determine a first transmission power level based at least in part on a first location of the first device and a second location of the network device, the first transmission power level being strong enough for the first uplink to reach the network device;
determine a second transmission power level based at least in part on a third location of the second device, a fourth location of another network device, and the second location of the network device, the second transmission power level being strong enough for the second uplink to reach the another network device but not the network device;
transmit on a first downlink to the first device the first transmission power level and on a second downlink to the second device the second transmission power level; and
establish the first uplink with the first device.

17. The non-transitory machine readable medium of claim 16, wherein the instructions, when executed by the at least one processor, further cause the at least one processor to:
receive a first downlink measurement reported by the first device and a second downlink measurement reported by the second device; and
determine the first transmission power level based at least in part on the first downlink measurement and the second transmission power level based at least in part on the second downlink measurement.

18. The non-transitory machine readable medium of claim 17, wherein the instructions, when executed by the at least one processor, further cause the at least one processor to:
establish a first control-message uplink with the first device and a second control-message uplink with the second device; and
receive the first downlink measurement via the first control-message uplink and the second downlink measurement via the second control-message uplink.

19. The non-transitory machine readable medium of claim 16, wherein the instructions, when executed by the at least one processor, further cause the at least one processor to:
estimate the first location of the first device, the third location of the second device, and the fourth location of the another network device.

20. The non-transitory machine readable medium of claim 16, wherein the instructions, when executed by the at least one processor, further cause the at least one processor to:
transmit, via a backhaul link to the another network device, information for establishing the second uplink with the second device.

* * * * *